US012162307B2

(12) United States Patent
Richardson et al.

(10) Patent No.: US 12,162,307 B2
(45) Date of Patent: Dec. 10, 2024

(54) SUPPORT CLIP-BRUSH HOLDER AND BRUSH KEEPER ASSEMBLY FOR STORING PAINT BRUSHES

(71) Applicant: John Allen Richardson, Toledo, OH (US)

(72) Inventors: John Allen Richardson, Toledo, OH (US); Raymond Michael Niscior, Toledo, OH (US)

(73) Assignee: John Allen Richardson, Toledo, OH (US)

( * ) Notice: Subject to any disclaimer, the term of this patent is extended or adjusted under 35 U.S.C. 154(b) by 341 days.

(21) Appl. No.: 17/528,083

(22) Filed: Nov. 16, 2021

(65) Prior Publication Data

US 2023/0150298 A1 May 18, 2023

(51) Int. Cl.
*B44D 3/12* (2006.01)
*A46B 17/02* (2006.01)

(52) U.S. Cl.
CPC .............. *B44D 3/123* (2013.01); *A46B 17/02* (2013.01); *A46B 2200/202* (2013.01)

(58) Field of Classification Search
CPC ........ B44D 3/123; A46B 17/02; A47J 43/287; Y10T 24/344
See application file for complete search history.

(56) References Cited

U.S. PATENT DOCUMENTS 3,317,087 A 5/1967 Landis
4,101,046 A 7/1978 Puntillo
(Continued)

FOREIGN PATENT DOCUMENTS

FR 2950514 4/2011
FR 2950514 A3 4/2011
(Continued)

OTHER PUBLICATIONS

"Multifunctional Painting Tool Brush and Roller Cleaning Tool, Paint Bucket Handle & Opener, Magnetic Brush Holder . . . ", Amazon.com, retrieved Nov. 5, 2021 from URL: https://www.amazon.com/Multifunctional-Painting-Cleaning-Magnetic-Water-Based/dp/B091TDL5Z7 (6 pages).
(Continued)

*Primary Examiner* — Jeffrey R Allen
(74) *Attorney, Agent, or Firm* — FOLEY & LARDNER LLP

(57) ABSTRACT

A support clip includes a container engagement section for mounting the support clip to an upper interior portion of a paint container, and a brush holder support section. A brush holder carries a vertically suspended paint brush. Edge surfaces of the container engagement section include a first segment, a second segment, and an intermediate segment, which engage inner and lower surfaces of the container rim and an inner sidewall surface. A brush keeper kit for a paint brush employs used paint containers as brush keeper parts. The brush keeper kit includes a paint container adapter and a brush holder. The paint container adapter has an outer rim and an inner ledge, which define upper and lower sections for coupling upper and lower paint containers. The brush holder is mounted to an upper interior portion of the lower paint container and supports the paint brush within an interior space.

10 Claims, 12 Drawing Sheets

(56) References Cited

U.S. PATENT DOCUMENTS

| | | | | |
|---|---|---|---|---|
| 5,669,526 | A | 9/1997 | Keyfauver | |
| 6,269,977 | B1 | 8/2001 | Moore | |
| 6,419,194 | B1 * | 7/2002 | LoSacco | A46B 17/02 248/113 |
| 6,609,685 | B1 | 8/2003 | Lamont | |
| 6,616,110 | B1 | 9/2003 | Mcintee | |
| 6,871,825 | B2 | 3/2005 | Song | |
| 6,929,225 | B1 | 8/2005 | Kent | |
| 10,124,624 | B2 | 11/2018 | Gringer et al. | |
| D853,818 | S | 7/2019 | Bergman et al. | |
| 10,399,378 | B1 | 9/2019 | Mitchell | |
| 10,717,318 | B2 | 7/2020 | Baker | |
| 11,040,569 | B1 | 6/2021 | Ferlet | |
| 2005/0035131 | A1 | 2/2005 | Martinson | |
| 2005/0156085 | A1 | 7/2005 | Radovan | |
| 2005/0184077 | A1 | 8/2005 | Martinson | |
| 2006/0113310 | A1 | 6/2006 | Hawkins | |
| 2008/0283701 | A1 | 11/2008 | Kahn | |
| 2020/0016923 | A1 | 1/2020 | Lewan | |
| 2020/0352318 | A1 | 11/2020 | Tucker | |

FOREIGN PATENT DOCUMENTS

| | | | |
|---|---|---|---|
| GB | 2 160 093 | A | 12/1985 |
| WO | WO-99/39982 | | 8/1999 |
| WO | WO-2005/063080 | | 7/2005 |

OTHER PUBLICATIONS

"Shur-Line 1889670 Red Paint Can Clip, Red", Amazon.com, retrieved Nov. 5, 2021 from URL: https://www.amazon.com/Shur-Line-1889670-Red-Paint-Clip/dp/B01BHQ9H0O (7 pages).

"Shur-Line Shurline Paint Brush Clip", Lowes's, retrieved Nov. 2, 2021 from URL: https://www.lowes.com/pd/SHUR-LINE-1-Magnet-Metal-Plastic-Paint-Brush-Clips/50053439 (4 pages).

* cited by examiner

FIG. 1A
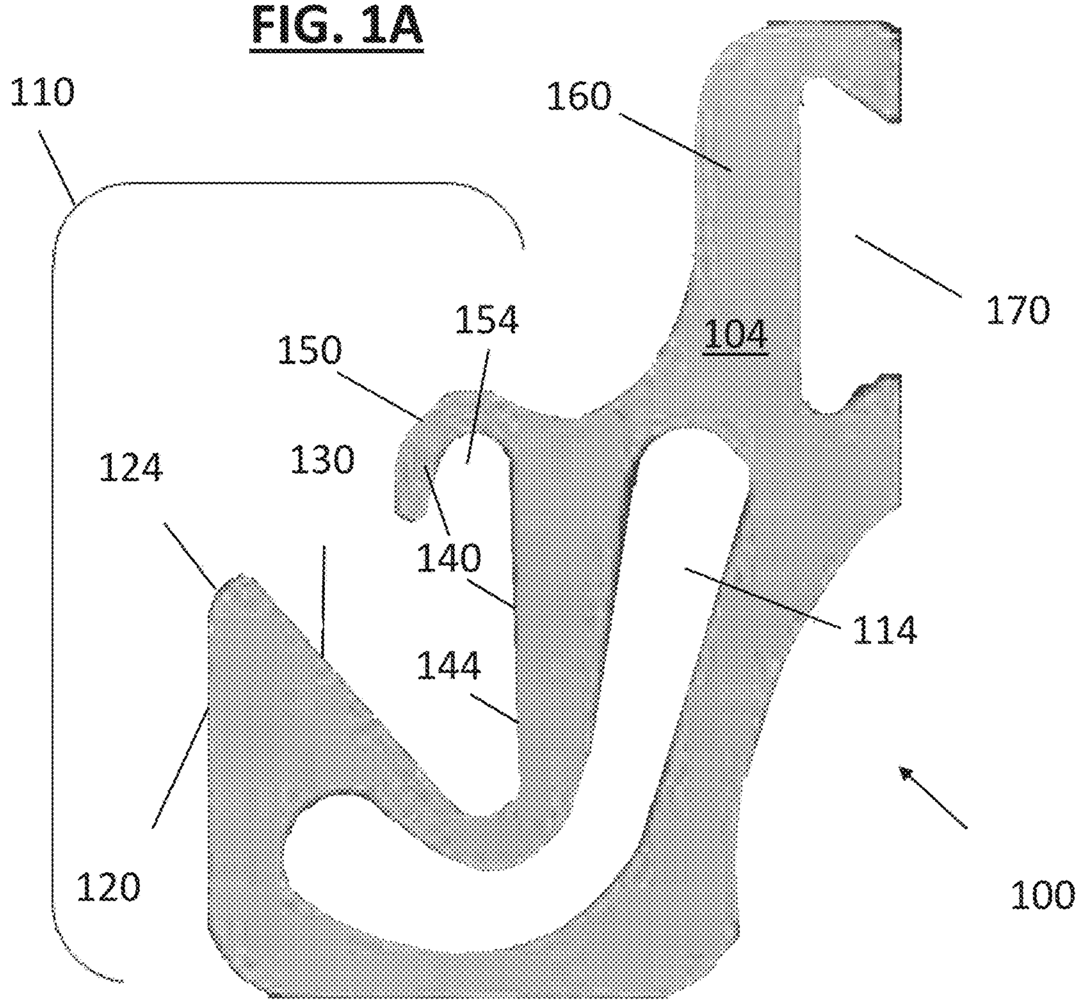
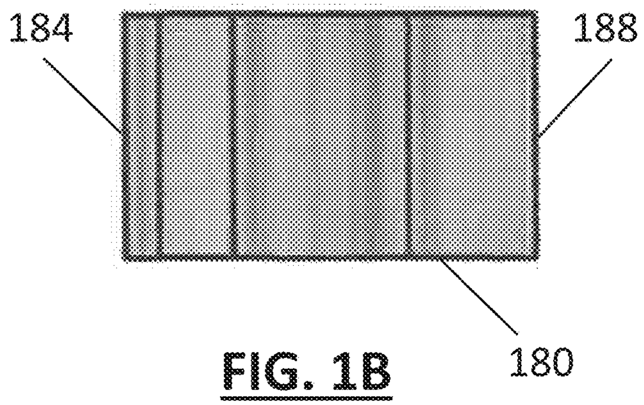
FIG. 1B
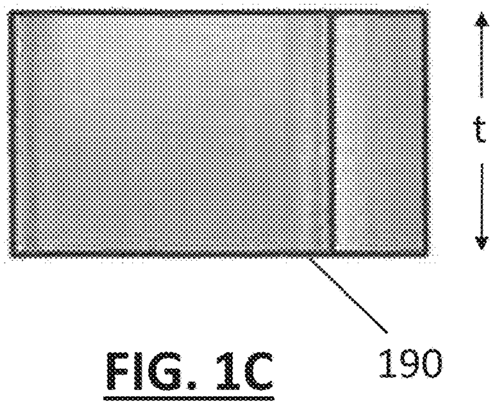
FIG. 1C

FIG. 3C
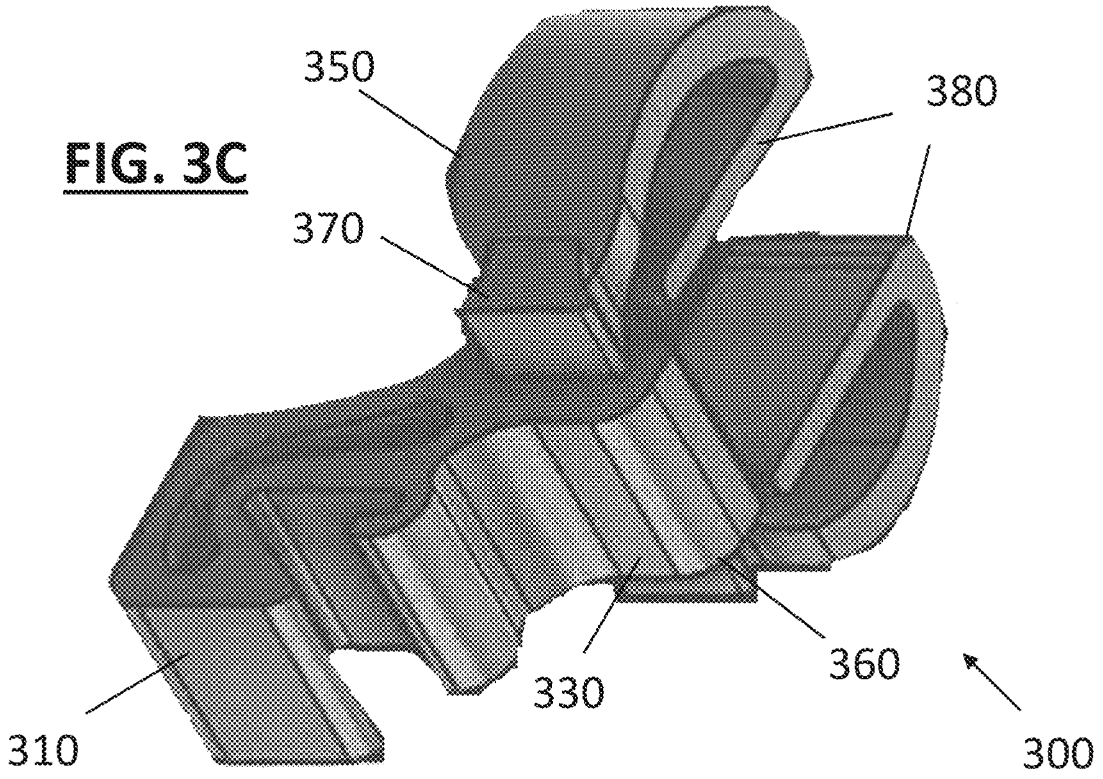
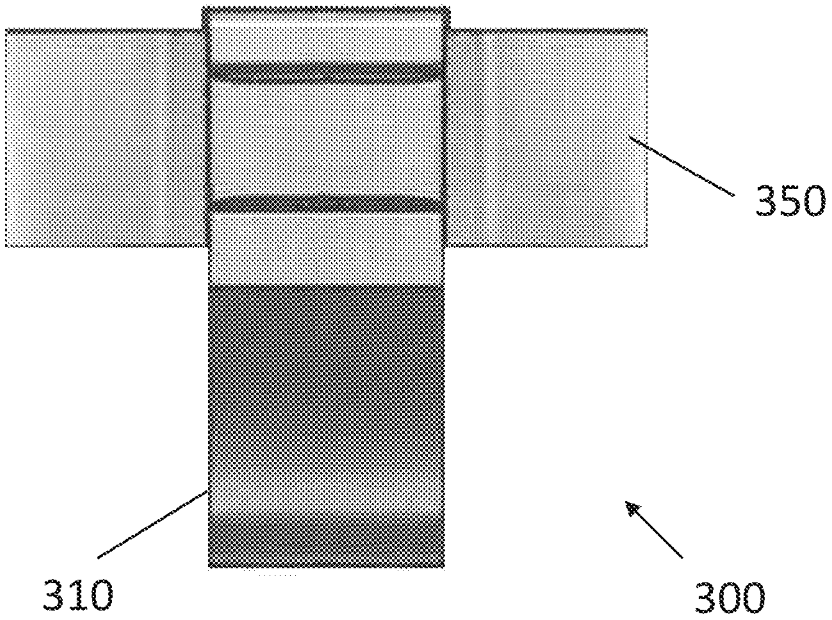
FIG. 3D

SUPPORT CLIP-BRUSH HOLDER AND BRUSH KEEPER ASSEMBLY FOR STORING PAINT BRUSHES

TECHNICAL FIELD

The present disclosure relates generally to support clips, brush holders and brush keepers for storing paint brushes between uses.

BACKGROUND

One of the most common challenges faced by individuals who use a paint brush to apply paint from a paint container, such as a paint can or a paint bucket, is placement of the paint brush at rest during periods when painting is interrupted. Typically, the individual will place the paint brush in or on the container, either oriented vertically with the bristles of the brush resting against the bottom of the container, or oriented horizontally with the bristles resting against the top of the container. It is known to employ paint brush holders for this purpose, but generally such brush holders require that the holder, the brush, or both extend to the exterior of the container.

It is also known to use brush keepers to cover paint brushes for wet storage of the paint brushes when not in use. Typically, brush keepers are specialized devices that require transferring the brush to the brush keeper rather than storing the brush in its normal work environment.

SUMMARY

What is needed are improved methods and apparatus for holding and storing paint brushes during periods when painting is interrupted. What is needed are simplified, time saving methods for storing paint brushes during periods between uses. What is needed are methods and apparatus for holding paint brushes that use interior space within paint containers for compact, space-saving storage. What is needed are environmentally friendly methods for storing paint brushes that make use of materials on hand.

In an embodiment of a support clip, a flat member includes a container engagement section having a plurality of edge surfaces configured to mount to an upper interior portion of a paint container, and further includes a brush holder support section. The brush holder support section of the support clip is configured to carry a brush holder within the interior of the paint container. The edge surfaces of the container engagement section include a first segment and a second segment. The first segment is configured to engage an inner sidewall surface of the paint container extending below the rim. The second segment is configured to engage an inner edge of an annular rim, which extends inwardly from the upper edge of the sidewall of the paint container. The container engagement section may further include an intermediate segment extending between the first segment and the second segment, wherein the intermediate segment is configured to engage a lower surface of the rim.

In an embodiment, a brush keeper kit for a paint brush includes a paint container adapter and a brush holder. The paint container adapter includes an outer rim and an inner ledge, which define a lower section that is coupled to a lower paint container and an upper section that is coupled to an upper paint container of a brush keeper assembly. The brush holder is configured to be mounted to an upper interior portion of the lower paint container and configured to support the paint brush within an interior space of the brush keeper assembly. The brush keeper kit of the disclosure enables painters to use paint containers as brush keeper parts to cover paint brushes when not in use for wet storage of paint brushes.

In use of the paint container adapter, a first, lower paint container is placed in its normal orientation, and a second, upper paint container is placed over the first container in an inverted configuration with the open face of the upper container aligned with the open face of the lower container. The paint container adapter fits over the periphery of the open upper end of the lower paint container that faces upwardly and fits under the periphery of the open end of the upper paint container that is inverted to face downwardly. The paint container adapter, lower paint container, and upper paint container define an interior space. The paint container adapter is configured to seal the periphery of the open upper end of the lower paint container and the periphery of the open end of the upper paint container to prevent or limit release of vapors within the interior space.

In an embodiment, a support clip comprises a flat member including a container engagement section comprising a plurality of edge surfaces configured for mounting the support clip to an upper interior portion of a paint container, and a brush holder support section configured for mounting a paint brush holder to the support clip and for supporting the paint brush holder, wherein the upper interior portion of the paint container comprises a rim comprising an annular member extending inwardly from an upper edge of a sidewall of the paint container, and further comprises an inner sidewall surface of the container extending below the rim, and wherein the plurality of edge surfaces of the container engagement section comprise a first segment configured to engage the inner sidewall surface of the container extending below the rim and a second segment configured to engage an inner edge of the annular rim that extends inwardly from the upper edge of the sidewall of the paint container.

In an embodiment, a brush keeper kit for a paint brush comprises a paint container adapter, comprising an outer rim and an inner ledge, wherein the outer rim and inner ledge define a lower section of the paint container adapter and an upper section of the paint container adapter, wherein the lower section of the paint container adapter is configured to fit over a periphery of an open upper end of a lower paint container that faces upwardly, and the upper section of the paint container adapter is configured to fit under a periphery of an open end of an upper paint container that is inverted to face downwardly, and wherein the paint container adapter, the lower paint container, and the upper paint container define an interior space, and the paint container adapter is configured to seal the periphery of the open upper end of the lower paint container and the periphery of the open end of the upper paint container to inhibit escape of any vapor within the interior space; and a brush holder configured to be mounted to upper interior portion of the lower paint container and configured to support the paint brush within the interior space.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 1A is a front elevation view of a support clip for a paint container, according to the embodiment of FIGS. 1A-1E.

FIG. 1B is a top plan view of a support clip for a paint container, according to the embodiment of FIGS. 1A-1E.

FIG. 1C is a bottom plan view of a support clip for a paint container, according to the embodiment of FIGS. 1A-1E.

FIG. 3C is a perspective view of brush holder/clip support assembly, according to the embodiment of FIGS. 3A-3D.

FIG. 3D is an outward-facing side elevation view of brush holder/clip support assembly, according to the embodiment of FIGS. 3A-3D.

DETAILED DESCRIPTION

Figure 1D:
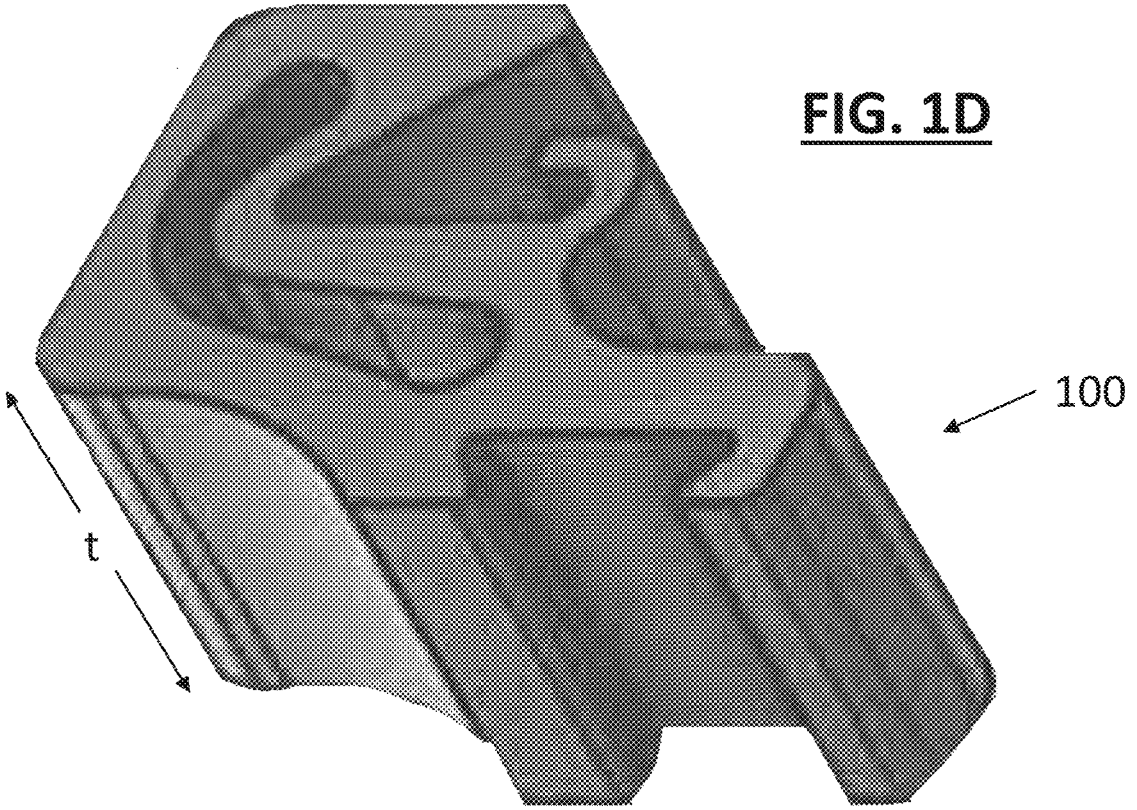
FIG. 1D is a perspective view of a support clip for a paint container, according to the embodiment of FIGS. 1A-1E.

The present disclosure is here described in detail with reference to embodiments illustrated in the drawings which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

When using containers of paint and paint brushes, professional painters and other users also often employ painting accessories to facilitate painting. One type of painting accessory is brush holders which can be used for organizing and storing paint brushes. Another type of painting accessory is brush keepers which cover paint brushes when not in use and allow for wet storage of paint brushes. Using brush keepers, when painters take a break they may not have to wash their brushes.

Disclosed embodiments of a support clip/brush holder assembly and a brush keeper kit provide various advantages over conventional painting accessories. The support clip/brush holder assembly of the disclosure can be easily mounted to the rim and inner sidewall surface of a typical paint container to be securely supported by these container structures. The support clip/brush holder assembly of the disclosure retains brushes within an interior space of a paint can or of an interior space defined by multiple paint cans. Support clip/brush holder assemblies of the disclosure can hold one or more paint brushes suspended in a vertical orientation within a paint container. Unlike conventional brush clips and brush holders, no portion of the support clip/brush holder assembly attaches to the exterior of the container or extends beyond the interior space defined by one or more paint can(s). Due to these characteristics, the support clip/brush holder assembly may be employed as a component of the brush keeper kit of the present disclosure.

In disclosed embodiments, the support clip is a flat member that includes a container engagement section having a plurality of edge surfaces configured to mount to an upper interior portion of a paint container, and that further includes a brush holder support section. The brush holder support section of the support clip carries a brush holder within the interior of the paint container. The brush holder is configured to hold a paint brush suspended from the brush holder. In the present disclosure, brush holder and paint brush holder refer to a member configured for holding a paint brush.

The upper interior portion of commercial paint containers has a fairly standard configuration across a range of sizes, types, and constituent materials of paint cans and buckets. An annular rim extends inwardly from the upper end of the container's sidewall. The support clip is configured to engage an inner edge of the rim and an inner sidewall surface of the container just below the rim, and may further engage a lower surface of the rim. A container engagement section of the support clip includes various edge surfaces configured to engage these container surfaces.

The edge surfaces of the container engagement section of the support clip include a first segment configured to engage an inner sidewall surface of the container extending below the rim, and a second segment configured to engage an inner edge of the container rim. The edge surfaces may further include an intermediate segment extending between the first segment and the second segment, wherein the intermediate segment is configured to engage a lower surface of the rim. In an embodiment, the second segment includes a hook configured to fit over an upper lip at the inner edge of the rim, and a portion of the second segment is configured to engage an inner edge surface at the inner edge of the rim. In an embodiment, the first segment and the intermediate segment form a convex angular member configured to fit into a recess at a lower surface of the rim adjacent the sidewall. In an embodiment, the first segment includes a protrusion configured to abut against the inner sidewall surface of the container in order to adjust orientation of the support clip. In an embodiment, the support clip snaps into place and is frictionally retained by the rim and the sidewall.

The brush keeper kit of the disclosure enables painters to use paint containers as brush keeper parts to cover paint brushes when not in use for wet storage of paint brushes. The brush keeper kit allows a painter to store one or more paint brushes in an interior space defined by first and second paint containers stacked in an open end-to-end configuration with lids of both containers removed. A first, lower paint container is placed in its normal orientation, and a second, upper paint container is placed over the first container in an inverted configuration with the open face of the upper container aligned with the open face of the lower container. The brush keeper kit includes a paint container adapter that fits over the periphery of the open upper end of the lower paint container that faces upwardly and that fits under the periphery of the open end of the upper paint container that is inverted to face downwardly. The paint container adapter connects the upper and lower containers in a stacked configuration.

In an environmentally-friendly arrangement, the brush keeper kit of the disclosure enables painters to employ materials at hand such as used paint cans or paint buckets. The brush keeper kit of the disclosure permits storage of paint brushes in paint containers between painting sessions, thereby saving time.

The brush keeper kit of the disclosure may include a brush holder configured to hold one or more paint brushes within the brush keeper interior space. In an embodiment, the brush holder is secured to the lower paint container and holds a paint brush suspended below the brush holder. In an embodiment, the brush holder is secured to an inner sidewall surface and rim of the lower container. In an embodiment, the brush keeper kit includes the support clip/brush holder assembly of the disclosure.

The paint container adaptor together with the upper and lower paint containers define an interior space for wet storage of one or more paint brushes. The present disclosure sometimes uses the term "brush keeper interior space" to describe the interior regions of upper and lower paint containers stacked in an open end-to-end configuration with the paint container adapter of the disclosure. In a use case of wet storage using the brush keeper kit of the disclosure, one or more paint brushes may be stored with bristles at least partially immersed in liquid stored in the lower paint container, such as in paint or solvent. In a use case of wet storage using the brush keeper kit of the disclosure, one or more paint brushes may be stored with bristles suspended above liquid stored in the lower paint container, such as in volatile vapors within the brush keeper interior space. The interface between paint container adapter and upper and lower paint containers serves as a barrier to evaporation of volatile materials such as aqueous or non-aqueous paints and solvents. The paint container adapter of the disclosure prevents or limits loss of volatile materials during a time interval of wet storage In typical manufacture of a paint container 610 (also referred to herein as a paint can or paint bucket) as seen in FIG. 6B, the container includes a sidewall 614 extending from a base 612 to a top edge 616. As seen in FIG. 6C, at the top edge 682 of the sidewall the container includes a bead that extends around the periphery of the upper end of the container. The container includes a radially inwardly extending annular element 680 secured to the top 682 of the sidewall 614 of the container. In the present disclosure, this annular element is generally referred to as the rim. The rim 680 extends radially inwardly from a major (outer) diameter to a minor (inner) diameter. In the present disclosure, structure of the rim at the minor (inner) diameter is sometimes referred to as the inner edge of the rim. An upper portion of the inner edge 685 may include a lip 684. A side portion of the inner edge 685 may define an inner edge surface 688 of the rim 680.

The rim 680 may include a seaming panel for attachment to a side wall of the container by mechanical crimping or rolled seaming to a can flange adjacent the outer edge of the rim. An upper surface of the rim may define a ring groove 684 extending in a circular path entirely around the ring element between the major and minor diameters of the ring. A lower surface 676 of the rim 680 extends from a junction to sidewall surface 670 of the container to the inner edge 685 of the rim. The rim may include a recess 674 adjacent the junction of the rim 680 to the inner sidewall surface 670.

An area at the top of the container that is not covered by the rim 680 defines a circular container opening 690, providing access to interior space of the container. Typically, a paint container lid (not shown in the drawings) is friction fit onto the rim 680 covering the opening 690. The lid may include a central downward projection that fits tightly in the circular can opening, and may include an annular protrusion sized to fit snugly within the ring groove 684 of the rim. In the brush keeper assembly of the disclosure as shown in FIG. 6D, the lids of lower paint container 610 and upper paint container 620 are both removed so that an opening of lower paint container 610 faces a corresponding opening of upper paint container in an open end-to-end configuration, resulting in a shared interior space 660.

In various embodiments, the support clip/brush holder assembly of the disclosure includes a support clip mounted to the container, and a brush holder mounted to the support clip. FIGS. 1A-1E show an embodiment of a support clip 100. Support clip 120 includes a container engagement section 110 that includes various structures configure to mount the support clip to the container, and a brush holder support section 160 configured to carry a paint brush within the interior space of the paint container. The container engagement section includes a first segment 120, a second segment 140, and an intermediate segment 130 extending between the first segment and second segment 140. In an embodiment, the first segment is configured to engage inner sidewall surface 670 of a container. The second segment 140 is configured to engage the inner edge 685 of the rim 680.

The second segment 140 is configured to engage the inner edge 685 of the rim 680. The second segment 140 may include a hook 150 defining an aperture 154 that is configured to engage the lip 684, and may include a straight portion 144 configured to engage the inner edge surface 688 of the rim.

In an embodiment, the container engagement section 110 of support clip 100 further includes an intermediate segment 130 that extends between the first segment 120 and the second segment 140. The intermediate segment may be configured to one or more structure at the lower surface 676 of the rim 680. In an embodiment, the first segment 120 and intermediate segment 130 are alighted at an acute angle forming a convex angular portion of the container engagement section 110. The first segment 120 and intermediate segment 130 may meet at a corner 124, which may include a rounded surface. In an embodiment, the intermediate surface 130 and corner 124 are configured to engage the recess 674 adjacent the junction to the inner sidewall surface 670, e.g., as shown in FIG. 6D. During installation, the support clip 100 may snap in place at the recess 674 and be frictionally retained by the rim 680 and the sidewall inner surface 670.

The support section 160 includes a junction 170 for joining the support clip to a brush holder. In an embodiment, the junction 170 is a socket of a pin-and-socket joint or dovetail joint. In an embodiment, the container engagement section 110 of support clip 100 is located at an outward facing portion of the support clip to face various structures of the container, while the brush holder support section 160 of support clip 100 is located at an inward-facing portion of the support clip to support a brush holder adjacent the central axis of the container. In an embodiment, the support section 160 is located above the container engagement section when the support clip is mounted to a paint container in its normal orientation.

As used in the present disclosure, "inward" and "outward" are relative terms for interior locations within a paint container. In an embodiment "inward" means closer to the central axis of a paint container and "outward" means further away from the central axis of the paint container. In an embodiment, "inward" and "outward" are relative terms for locations along a radius of a right circular cylinder. As used in the present disclosure, "central axis" refers to a central line segment extending in axial direction of a paint container. In an embodiment, "central axis" of a paint container refers to the axis of a right circular cylinder.

The support clip 100 may include a flat strip 104 of a hard material such as metal, polymeric material, or metal-polymer composite. The support clip 100 may be patterned with a cut-away portion 114 to reduce its weight and to improve mechanical properties. The support clip may be produced using various forming processes, such as molding, die cutting, and ink jet printing.

FIG. 1B is a top plan view of the support clip 100. FIG. 1C is a bottom plan view of a support clip 100. As shown in these views, the support clip 100 includes a thickness 1 alongside edge surfaces, such as side edges 184, 188. By virtue of its thickness, the support clip 100 extends along an arc of a circumference or circular cross section of a container, such as a paint container in the form of a right circular cylinder. As used in the present disclosure, "arc" refers to a portion of a substantially circular periphery of a circular cylindrical container. In an embodiment, "arc" refers to a portion of a circle concentric to a substantially circular periphery of a circular cylindrical container. A plurality of support clips may be mounted at different positions around the container circumference, to hold more than one brush holder/paint brush within a container.

Figure 1E:
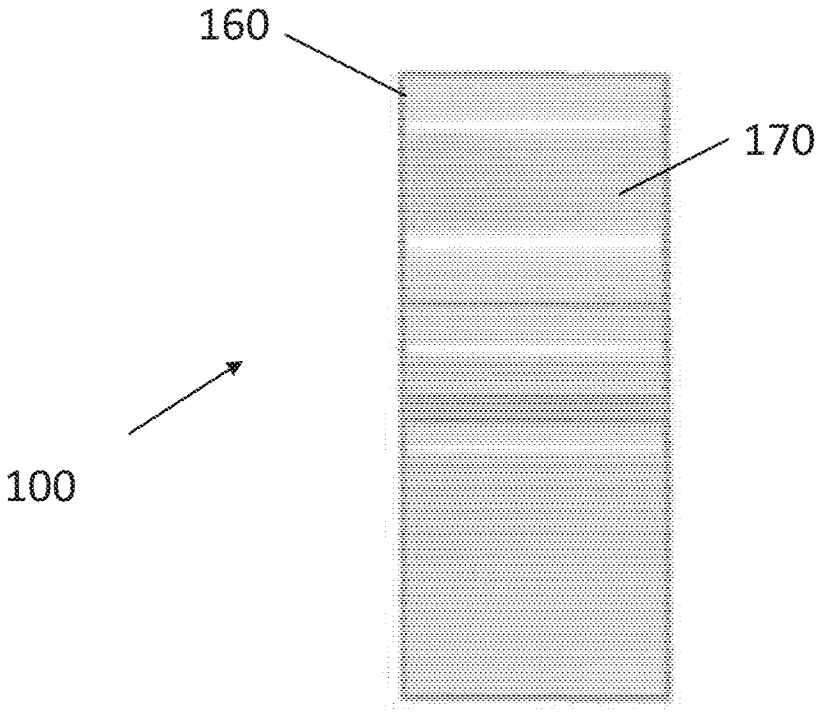
FIG. 1E is an inward-facing side elevation view of a support clip for a paint container, according to the embodiment of FIGS. 1A-1E.

FIG. 1D is a perspective view of the support clip 100 for a paint container, showing the thickness/of the clip. FIG. 1E is an inward-facing side elevation view of a support clip for a paint container showing the brush holder support section 160 and junction 170.

Figure 2A:
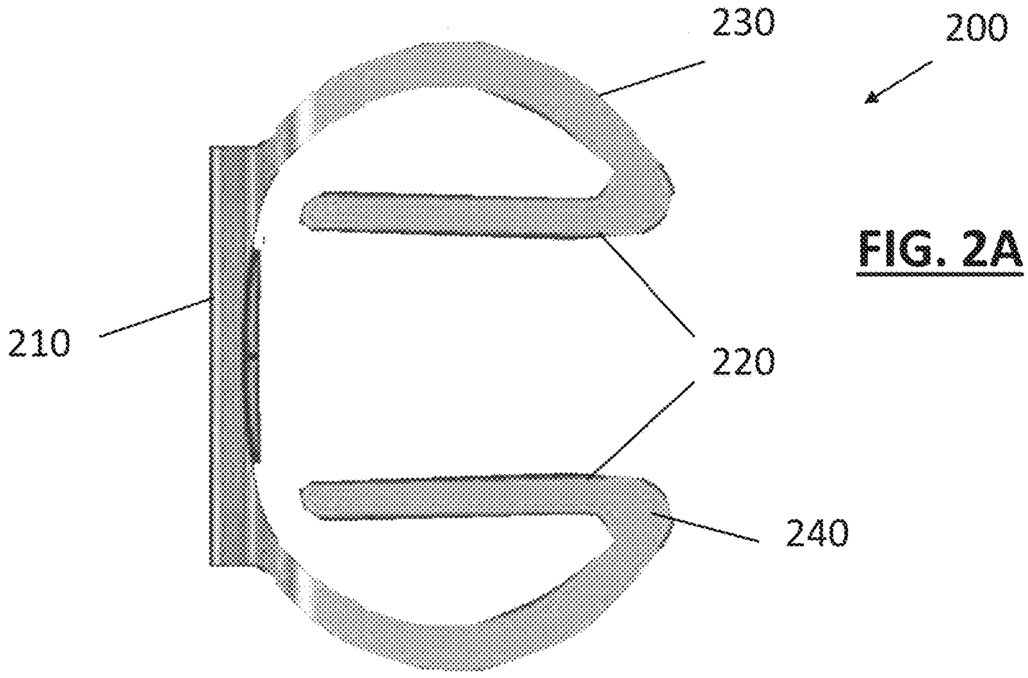
FIG. 2A is a bottom plan view of a brush holder, according to the embodiment of FIGS. 2A-2E.
Figure 2B:
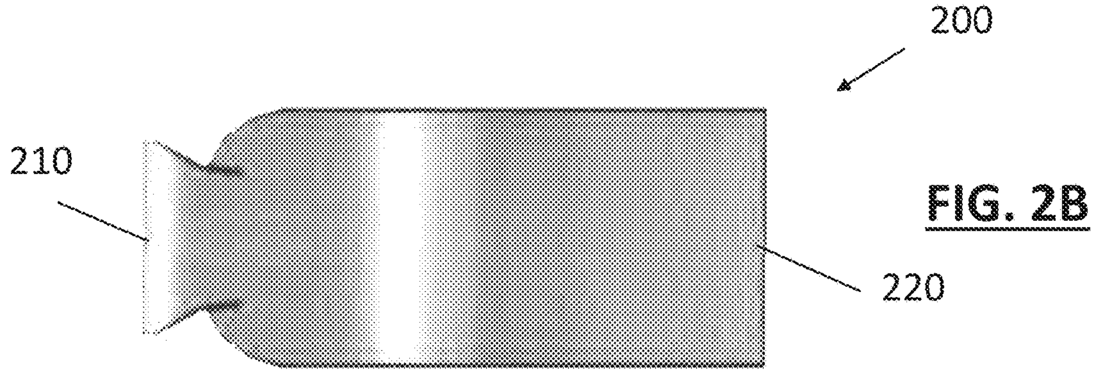
FIG. 2B is a front elevation view of a brush holder, according to the embodiment of FIGS. 2A-2E.
Figure 2C:
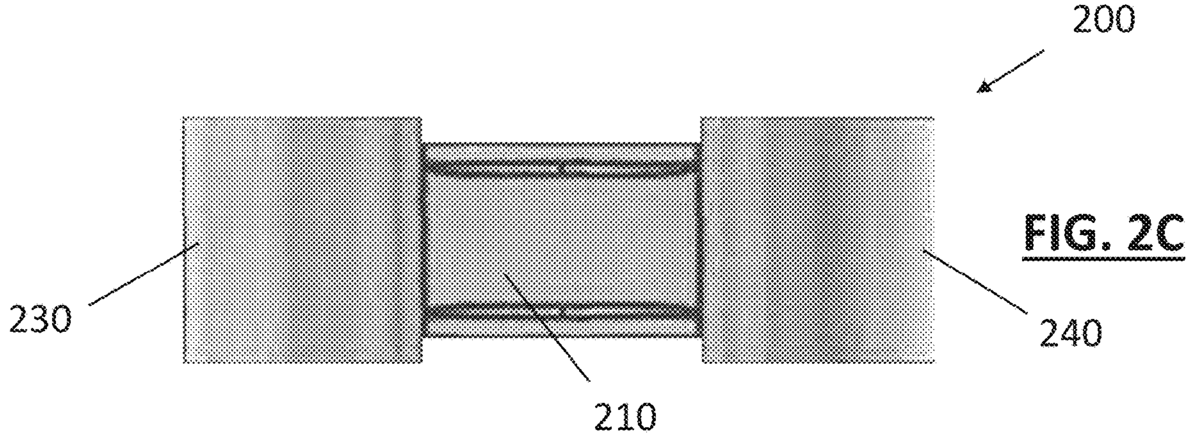
FIG. 2C is an inward-facing side elevation view of a brush holder, according to the embodiment of FIGS. 2A-2E.
Figure 2D:
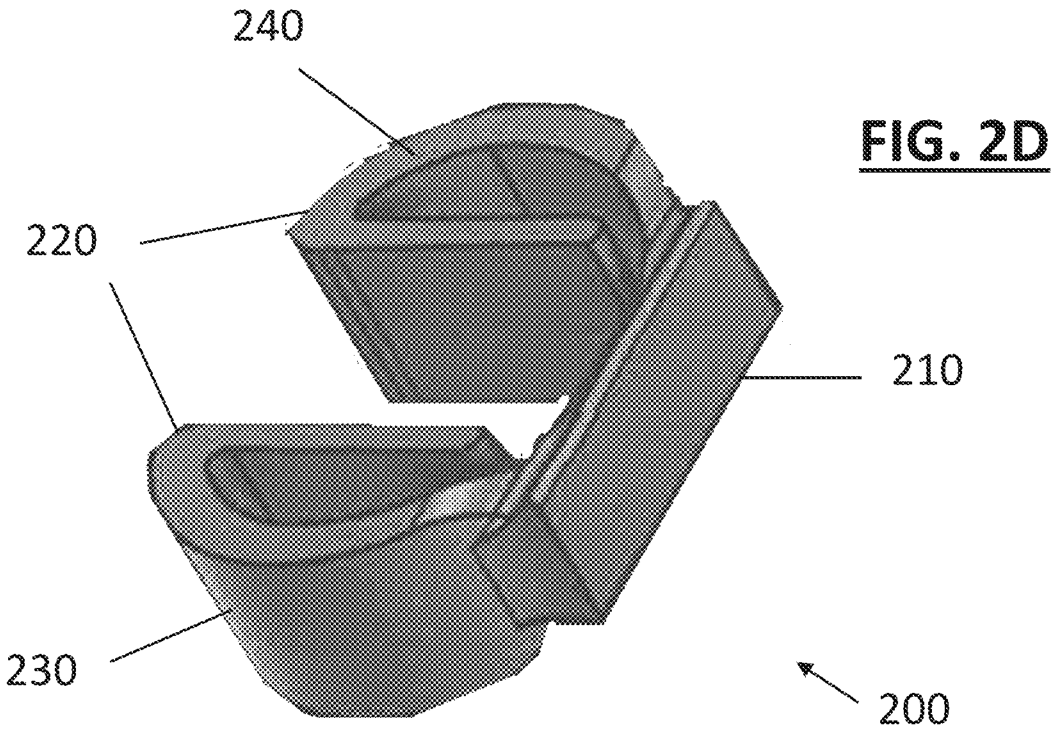
FIG. 2D is a perspective view of a brush holder, according to the embodiment of FIGS. 2A-2E.
Figure 2E:
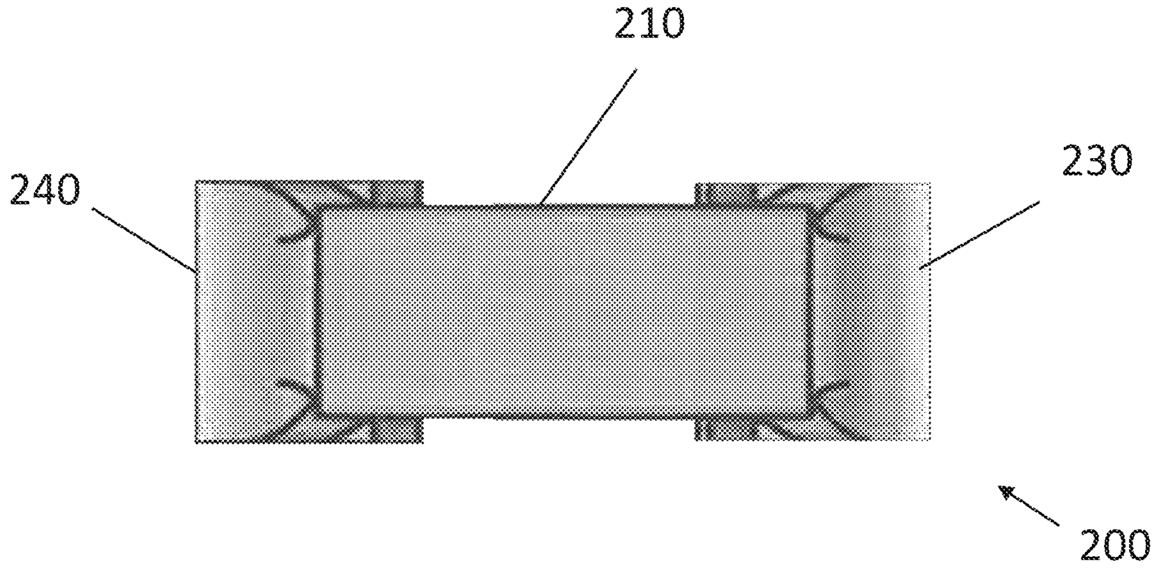
FIG. 2E is an outward-facing side elevation view of a brush holder, according to the embodiment of FIGS. 2A-2E.

FIGS. 2A-2E show an embodiment of brush holder 200. Brush holder 200 is configured to be mounted to a support clip (e.g., support clip 100) to form a support clip-brush holder assembly (e.g., support clip-brush holder assembly 300 shown in FIGS. 3A-3D). Brush holder 200 includes a junction 210 and a gripper section 220. As seen in FIGS. 2A, 2D, the gripper section 220 includes opposing gripper arms 230, 240 configured to grip a handle of a paint brush. As seen in FIG. 2B, the junction 210 is a pin and socket joint or dovetail joint, configured to mate with the socket 170 of support clip 100. The dovetail joint of brush holder 200 contrasts with conventional gripper clips, which typically include fasteners for mounting the gripper clip to a flat surface. The brush holder may include various versions designed for different types and sizes of paint brushes, such as larger-sized professional paint brushes and smaller-sized artist or hobbyist paint brushes.

Figure 3A:
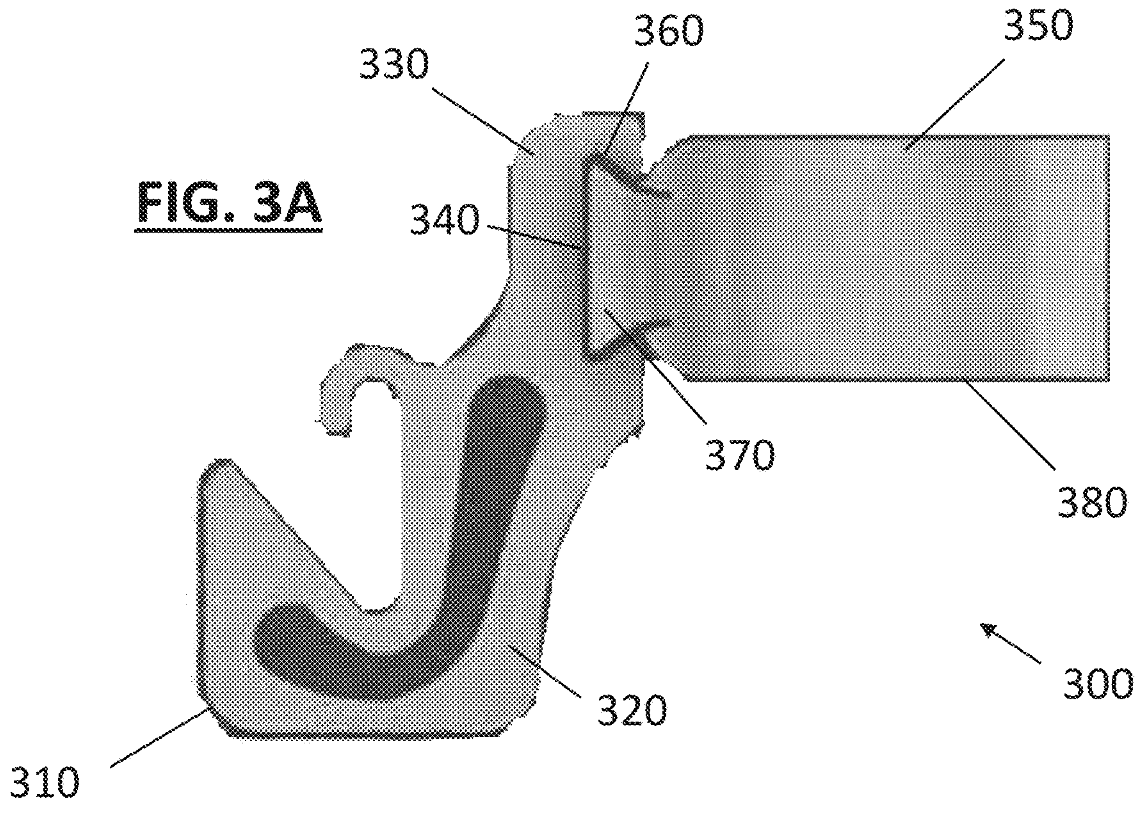
FIG. 3A is a front elevation view of brush holder/clip support assembly, according to the embodiment of FIGS. 3A-3D.
Figure 3B:
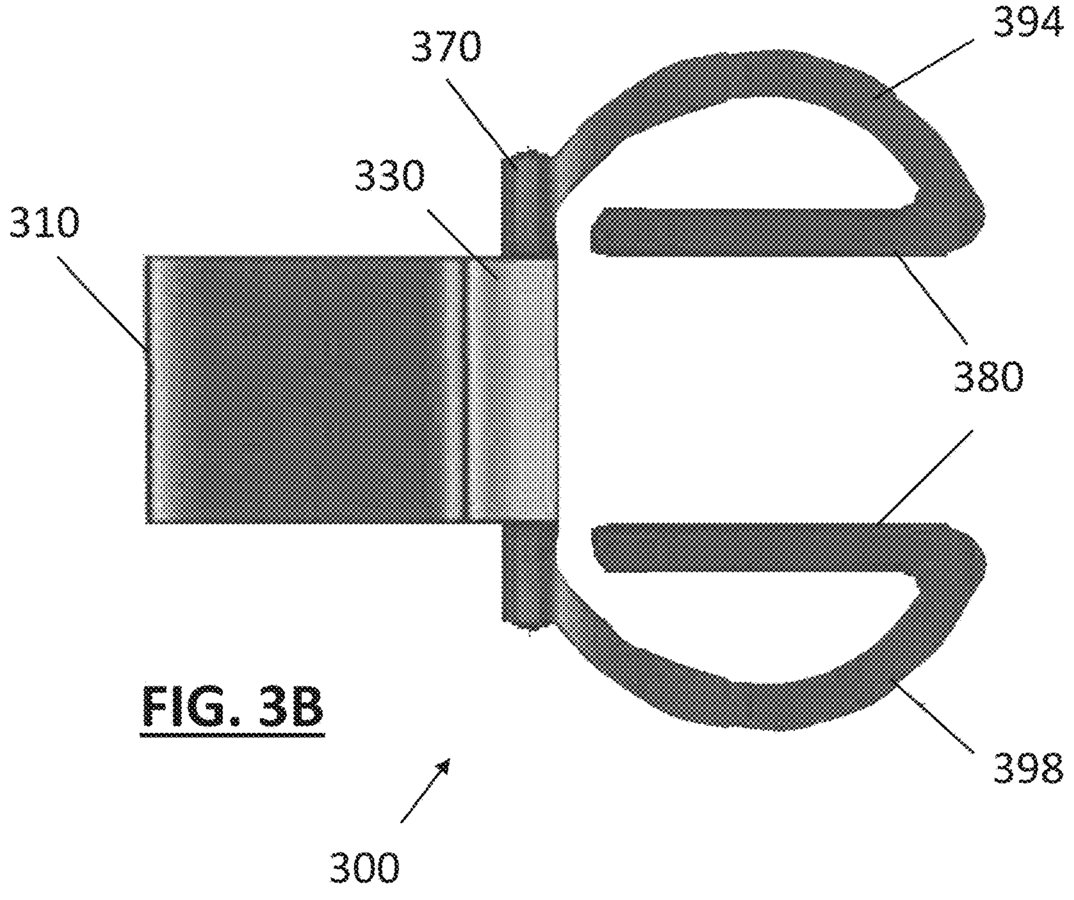
FIG. 3B is a bottom plan view of brush holder/clip support assembly, according to the embodiment of FIGS. 3A-3D.

FIGS. 3A-3D show an embodiment of support clip-brush holder assembly 300. As shown in the front elevation view of FIG. 3A, brush holder 350 is mounted to support clip 310. Brush holder 350 includes gripper section 380 and pin 370 mounted within socket 340 of support clip 310. At the support clip-brush holder junction 360, the support clip 310 carries the brush holder 350 in an orientation in which the gripper section 380 including gripper arms 384, 398 extends along a generally horizontal axis (FIGS. 3A, 3B). Support clip-brush holder assembly 300 is thereby oriented to support a paint brush suspended vertically below the gripper section 380 (FIG. 3A, FIG. 6B). FIG. 3C shows a perspective view of brush holder/clip support assembly 300, and FIG. 3D is an outward-facing side elevation view of brush holder/clip support assembly 300.

Figure 4A:
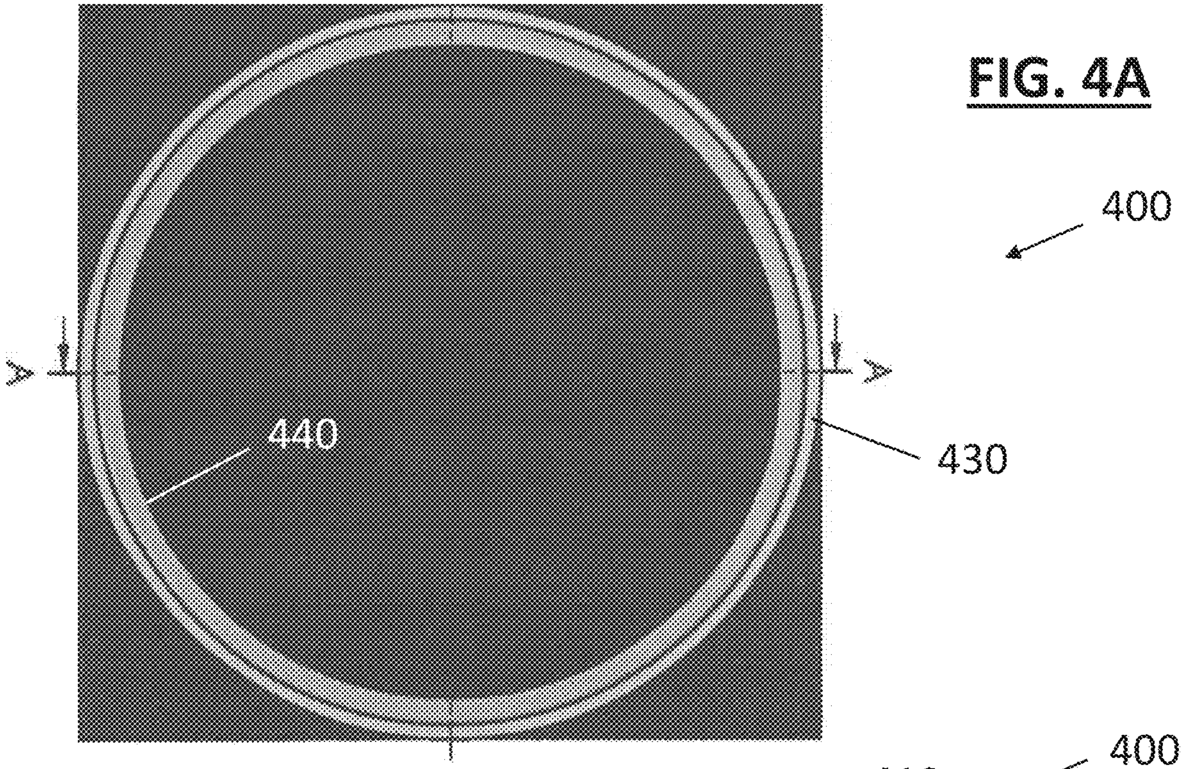
FIG. 4A is a plan view of a paint container adapter, according to the embodiment of FIGS. 4A-4C.
Figure 4B:
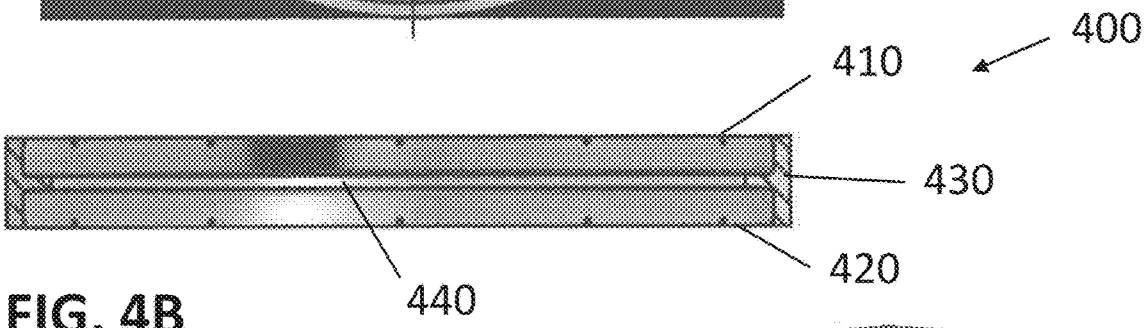
FIG. 4B is a sectional view of a paint container adapter in a section taken through the diameter A-A of FIG. 4A, according to the embodiment of FIGS. 4A-4C.
Figure 4C:
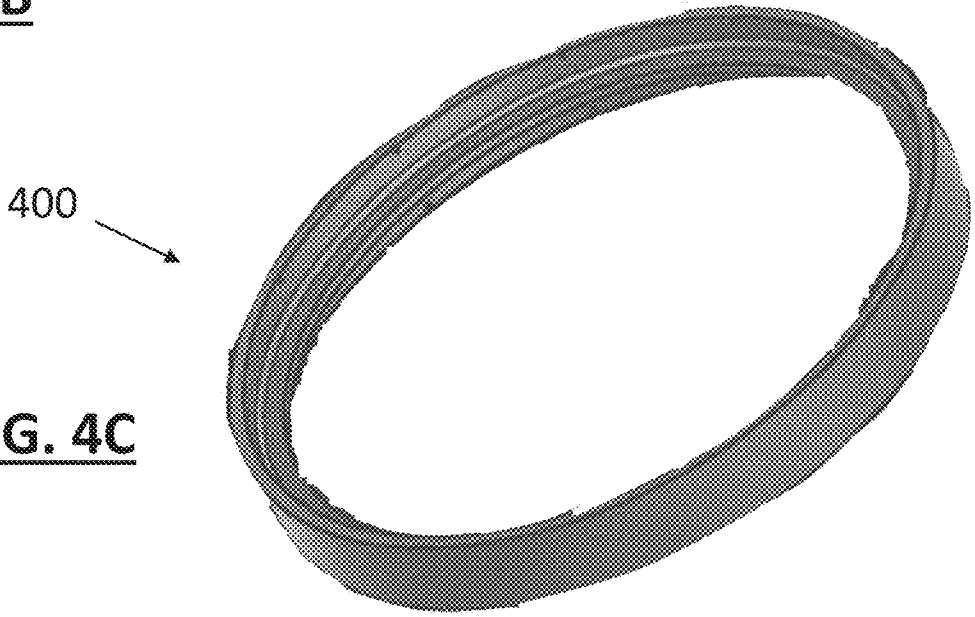
FIG. 4C is a perspective view of a paint container adapter, according to the embodiment of FIGS. 4A-4C.

FIGS. 4A-4C illustrate an embodiment of paint container adapter 400. The cylindrical paint container 400 adapter is configured to fit to the circumference of an open end of a lower container and to the circumference of the lower open end of an upper can, as shown at 630 in FIG. 6A. The paint can adaptor is also referred to herein as paint can/bucket adapter and adapter ring. The adapter ring serves as a connector for the two cans. The paint can adapter includes an outer cylindrical rim 430 and an inner annular ledge 440, as seen in the plan view of a paint container adapter 400 of FIG. 4A. The rim 430 and annular ledge 440 define an upper portion 410 and a lower portion 420 of the adapter ring, as seen in FIG. 4B showing a sectional view of the adapter ring 400 in a section taken through the diameter A-A of FIG. 4A. FIG. 4C shows a perspective view of a paint container adapter 400.

Figure 5A:
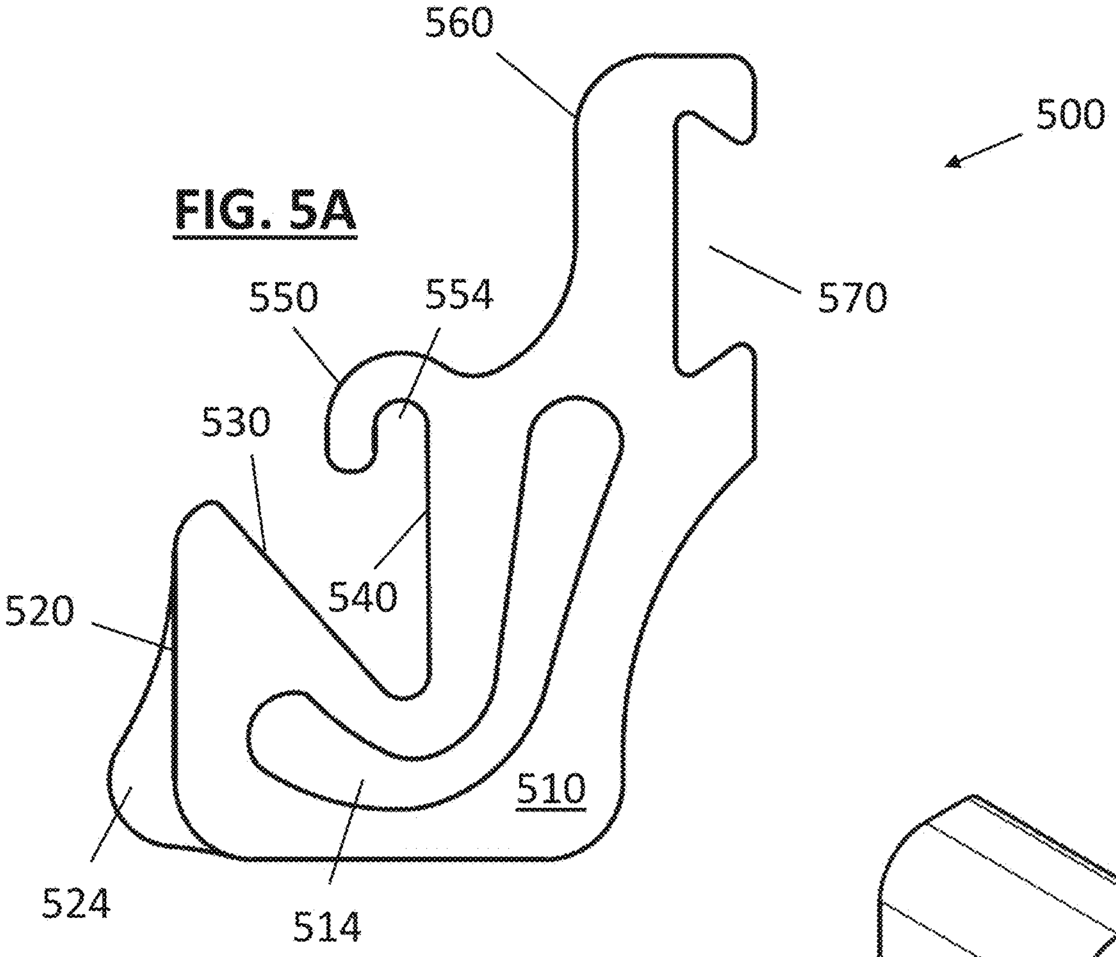
FIG. 5A is a front elevation view of a support clip for a paint container, according to the embodiment of FIGS. 5A-5B.
Figure 5B:
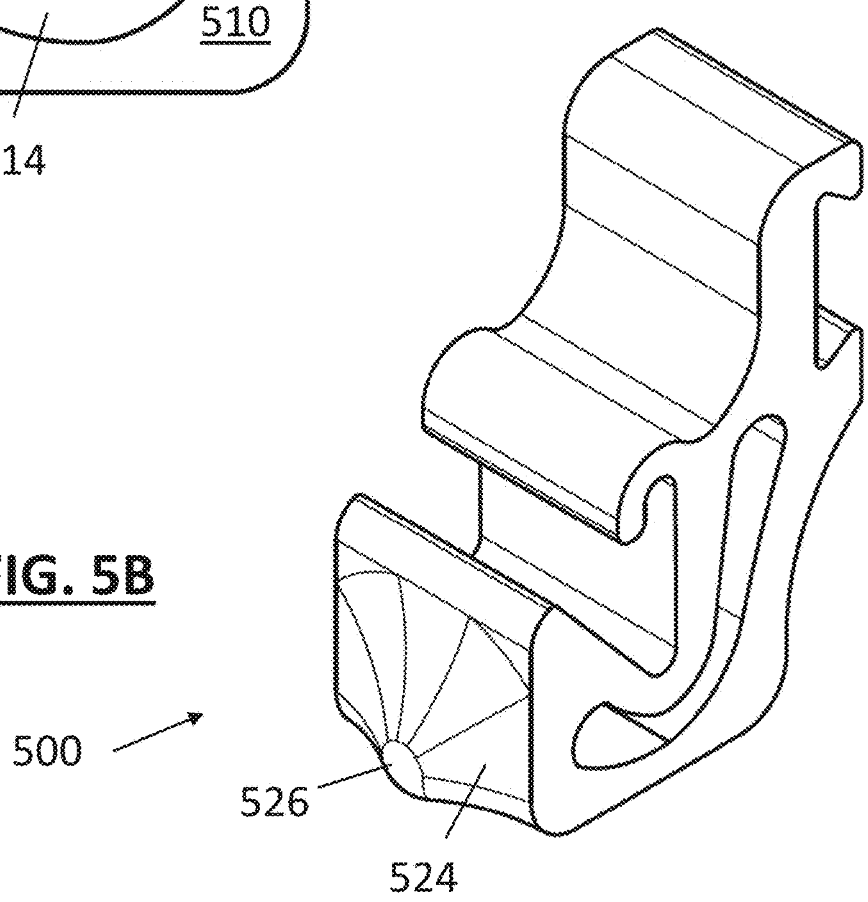
FIG. 5B is a perspective elevation view of a support clip for a paint container, according to the embodiment of FIGS. 5A-5B.

FIGS. 5A, 5B show an embodiment of a support clip 500. The support clip 500 is generally similar to the support clip 100 shown in FIGS. 1A-1E. Reference should be had to the description of support clip 100 for details of corresponding structures of support clip 500. In addition, support clip 500 includes a protuberance 524 which is configured to offset the first segment 520 from the container inner sidewall surface to alter the orientation of the support clip 500. After mounting of the support clip 500 to the container, outer surface 526 of protuberance 524 abuts against the container inner sidewall surface. As seen in the support clip embodiment 652 of FIG. 6D, engagement of protuberance 654 with sidewall 670 orients the support clip-brush holder assembly 650 to support the paint brush 640 in a generally vertical orientation (FIG. 6B).

Figure 6A:
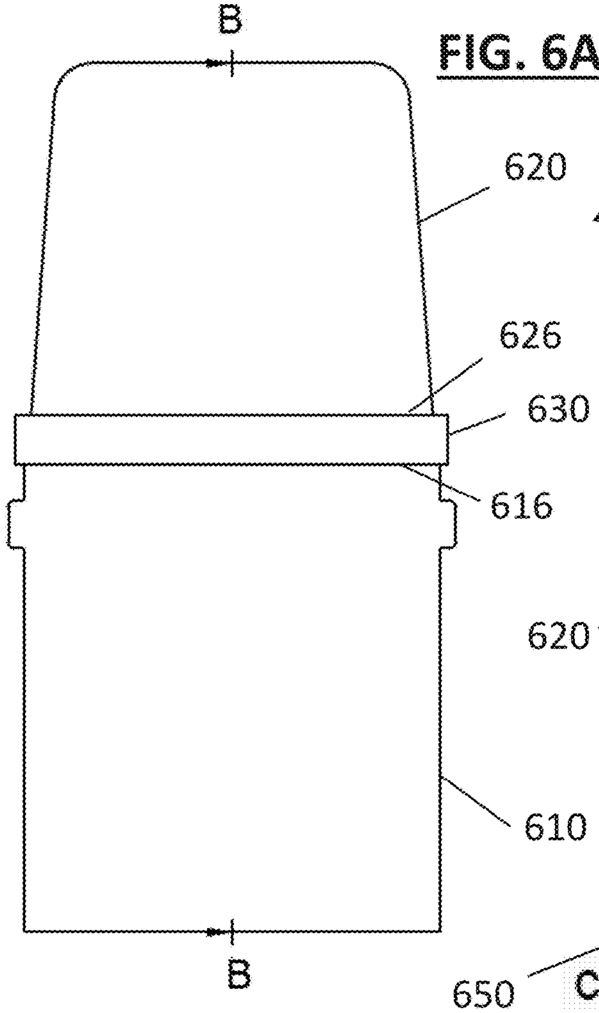
FIG. 6A is an elevation view of a brush keeper assembly including upper and lower paint containers, according to the embodiment of FIGS. 6A, 6B, 6D.
Figure 6B:
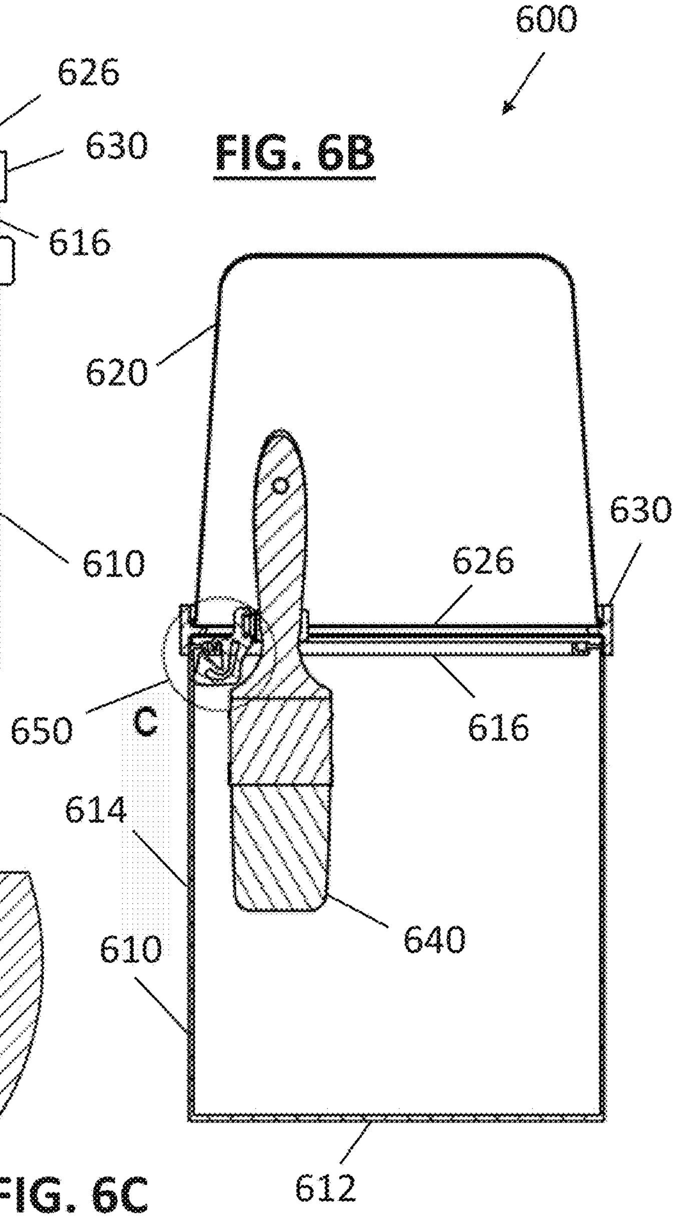
FIG. 6B is a sectional view of a brush keeper assembly in a section taken through the central vertical plane B-B of FIG. 6A, according to the embodiment of FIGS. 6A, 6B, 6D.
Figure 6C:
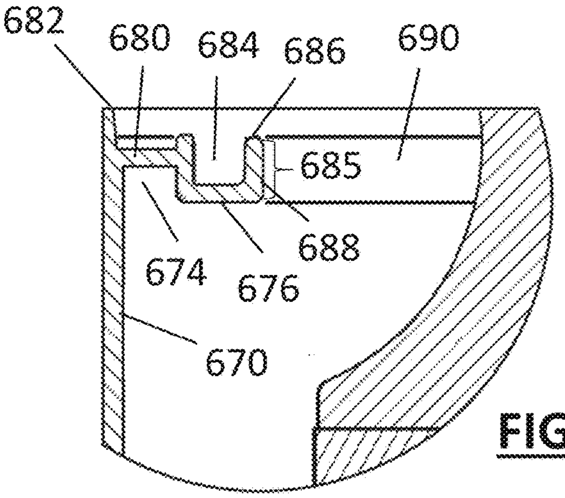
FIG. 6C is a sectional view of upper sidewall and rim of an illustrative paint container, according to an embodiment.
Figure 6D:
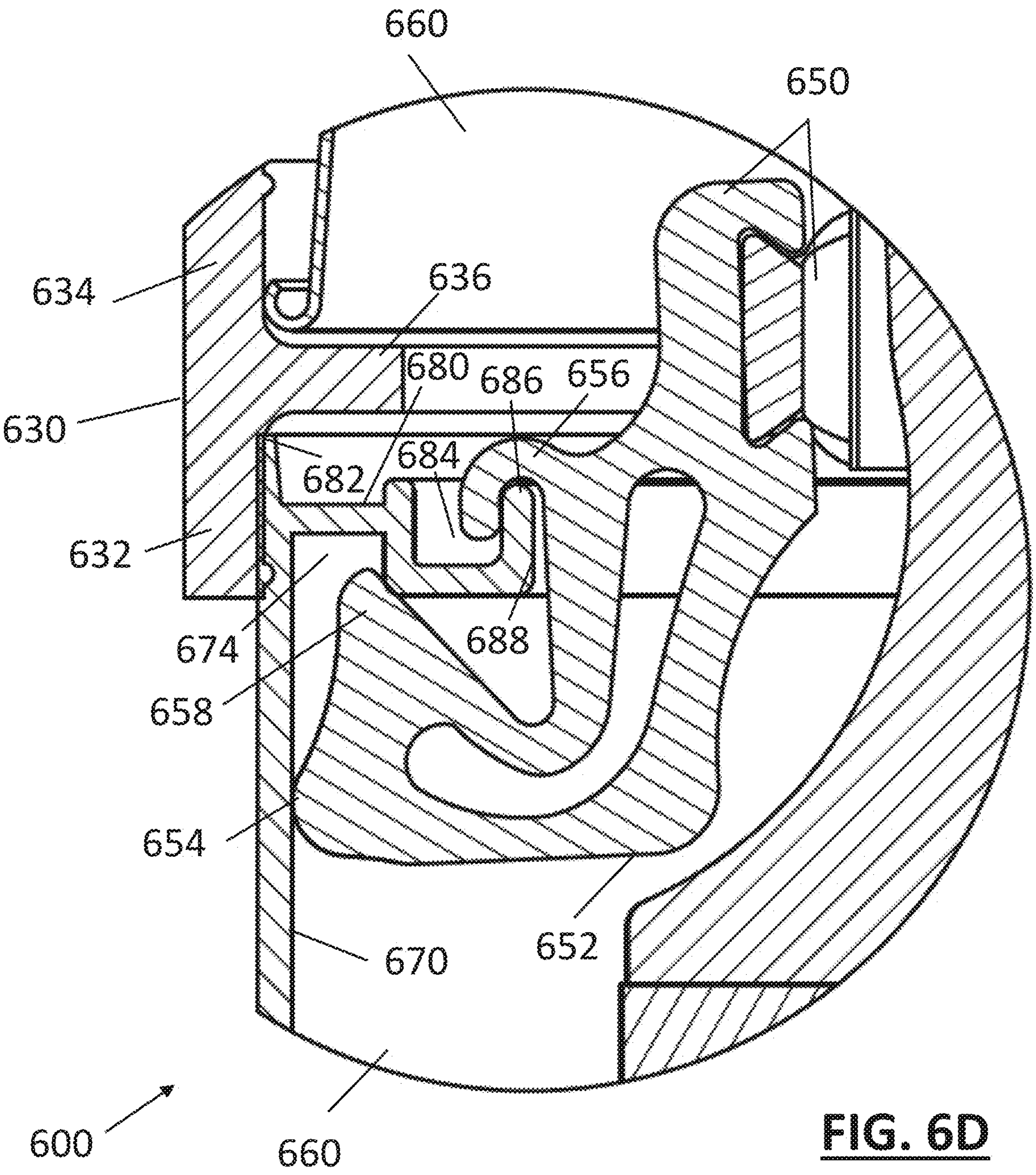
FIG. 6D is a sectional view of a brush keeper assembly at the area C of the sectional view of FIG. 6B showing a close-up view at the junction of upper and lower paint containers, according to the embodiment of FIGS. 6A, 6B, 6D.

FIGS. 6A, 6B, and 6D shows an embodiment of a brush keeper kit employed in a brush keeper assembly 600 for a paint brush. The brush keeper kit includes a paint container adapter and a brush holder 650. The brush keeper kit for a paint brush employs paint containers as brush keeper parts. The brush keeper kit enables painters to use paint containers as brush keeper parts to cover paint brushes when not in use and to provide for wet storage of paint brushes. As seen in the elevation view of FIG. 6A, the brush keeper assembly includes a lower paint container 610 and an upper paint container 620, coupled by a paint container adapter 630. The lower paint container 610 is placed in its normal orientation, and the upper paint container 620 is placed over the lower container 610 in an inverted configuration with the open face 624 of the upper container aligned with the open face 614 of the lower container. The paint container adapter 630 fits over the periphery of the open upper end 614 of the lower paint container that faces upwardly, and fits under the periphery of the open end 624 of the upper paint container that is inverted to face downwardly. The paint container adapter 630 connects the upper and lower containers 610, 620 in a stacked configuration.

FIG. 6B is a sectional view of a brush keeper assembly 600 in a section taken through the central vertical plane B-B of FIG. 6A. This section shows a sectional view of brush holder 650 supporting a paint brush 640. The brush holder 650 is configured to support a handle of the paint brush 640 with bristles of the paint brush suspended substantially vertically below the brush holder. In a use case of wet storage using the brush keeper kit 600, one or more suspended paint brushes 640 may be stored with bristles at least partially immersed in liquid stored in the lower paint container, such as in paint or solvent (not shown). In a use case of wet storage using the brush keeper kit of the disclosure, one or more paint brushes 640 may be stored with bristles suspended above liquid stored in the lower paint container, such as in volatile vapors within the brush keeper interior space. The interface between paint container adapter 630 and upper and lower paint containers 620, 610 serves as a barrier to evaporation of volatile materials such as paints and solvents. The paint container adapter 630 prevents or limits loss of volatile material during a time interval of wet storage.

FIG. 6D is a sectional view of a brush keeper assembly at the area C of the sectional view of FIG. 6B showing a close-up view of the brush holder 650 and other structures at the junction of upper and lower paint containers. Reference may be had to descriptions of FIGS. 1A-1E and 5A, 5B for a detailed description of edge surfaces of the container engagement section of the support clip 652. A first segment is configured to engage an inner sidewall surface 670 of the container extending below the rim 680, and a second segment is configured to engage an inner edge 685 of the container rim (FIG. 6C). The edge surfaces may further include an intermediate segment extending between the first segment and the second segment, wherein the intermediate segment is configured to engage a lower surface 676 of the rim (FIG. 6C). In an embodiment, the second segment includes a hook 656 configured to fit over an upper lip 686 at the inner edge of the rim, and a portion of the second segment is configured to engage an inner edge surface 688 at the inner edge of the rim. In an embodiment, the first segment and the intermediate segment form a convex angular member 658 configured to fit into a recess 674 at a lower surface of the rim adjacent the sidewall. In an embodiment, the first segment includes a protrusion 654 configured to abut against the inner sidewall surface 670 of the container in order to adjust orientation of the support clip. In an embodiment, the support clip 652 snaps into place and is frictionally retained by the rim and the sidewall.

Figure 7A:
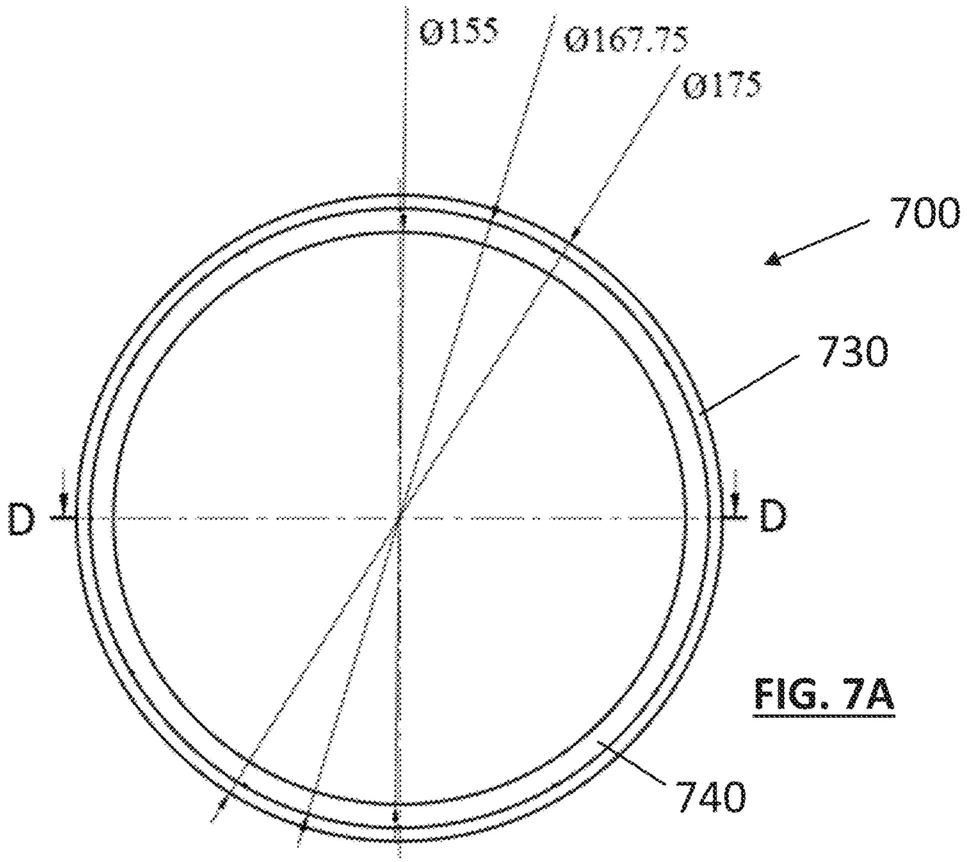
FIG. 7A is a plan view of a paint container adapter, according to the embodiment of FIGS. 7A-7D.
Figure 7B:
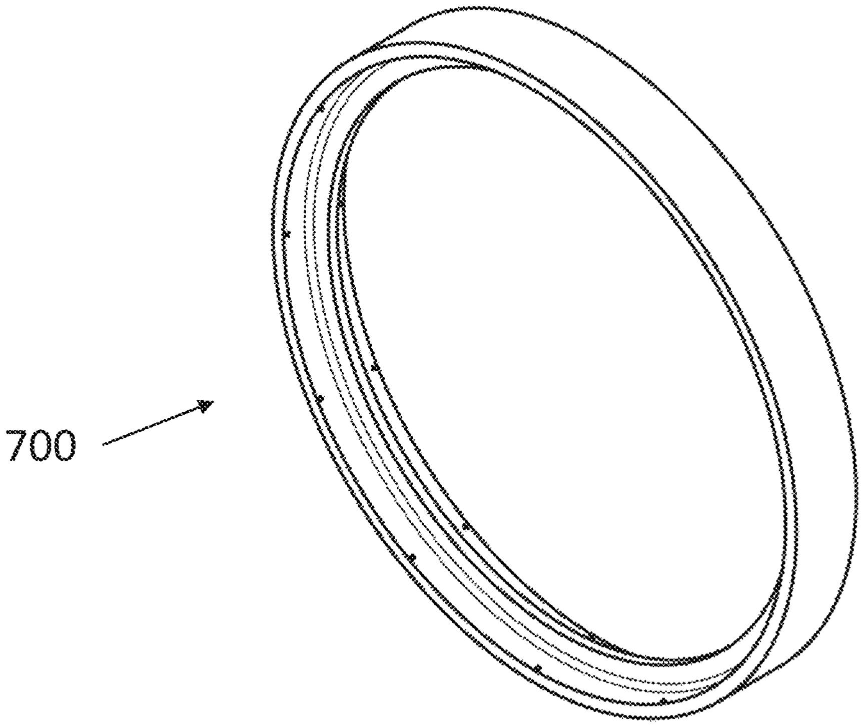
FIG. 7B is a perspective view of a paint container adapter, according to the embodiment of FIGS. 7A-7D.
Figure 7C:
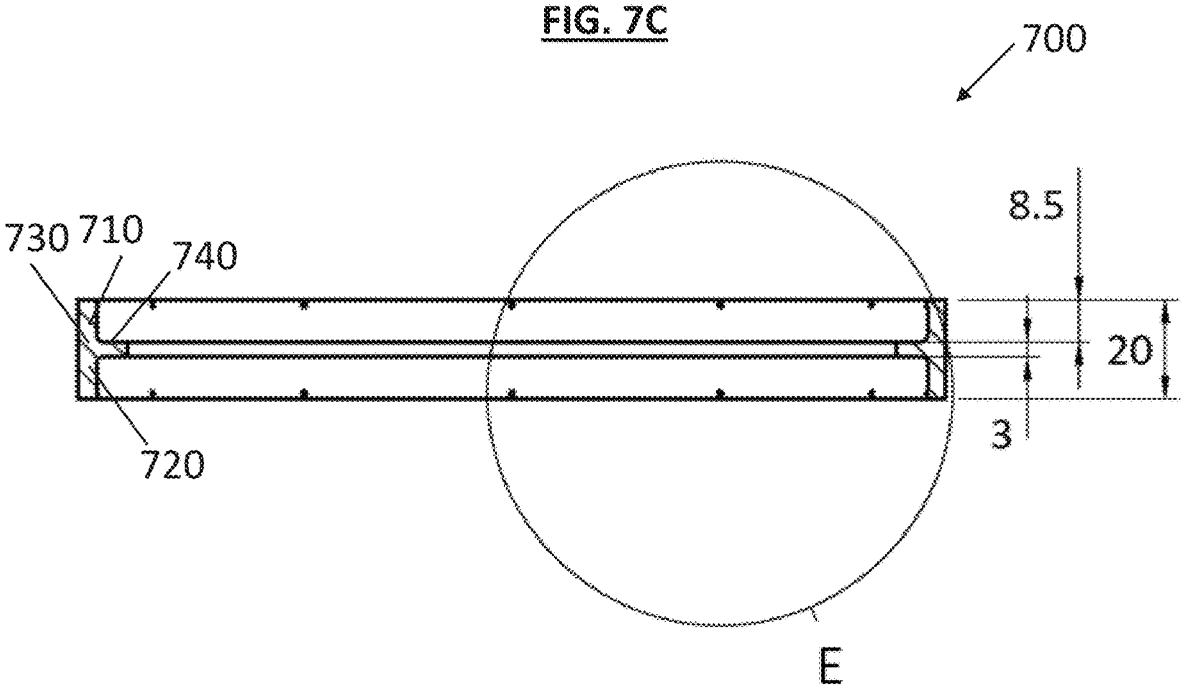
FIG. 7C is a sectional view of a paint container adapter in a section taken through the diameter D-D of FIG. 7A, according to the embodiment of FIGS. 7A-7D.
Figure 7D:
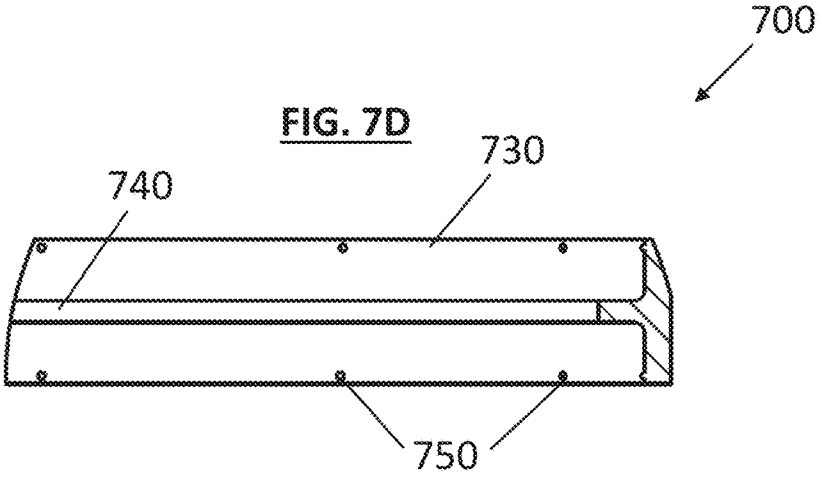
FIG. 7D is a sectional view of a portion of a paint container adapter at the area E of the sectional view of FIG. 7C, according to the embodiment of FIGS. 7A-7D.

FIGS. 7A-7D show an embodiment of a paint container adapter 700. The paint container adapter 700 is generally similar to the paint container adapter 400 shown in FIGS. 4A-4C and reference should be had to the description of paint container adapter 400 for details of corresponding structures of paint container adapter 700. In addition, FIGS. 7A, 7C show illustrative dimensions of paint container adapter 700. The sectional view of FIG. 7C and the partial sectional view of FIG. 7D show interior surfaces of the outer rim 730 include bumps 750 to aid retention of the lower container within the lower section 720 and to aid retention of the upper container within the upper section 710.

The foregoing method descriptions and the interface configuration are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

What is claimed is:

1. A support clip, comprising:

a flat member including a container engagement section comprising a plurality of edge surfaces configured for mounting the support clip to an upper interior portion of a paint container, and a brush holder support section configured for mounting a paint brush holder to the support clip and for supporting the paint brush holder,
  wherein the upper interior portion of the paint container comprises a rim comprising an annular member extending inwardly from an upper edge of a sidewall of the paint container, and further comprises an inner sidewall surface of the container extending below the rim, the inner sidewall surface and the rim defining a recess therebetween, and
  wherein the plurality of edge surfaces of the container engagement section comprise:
    a first segment configured to engage the inner sidewall surface of the container extending below the rim;
    a second segment configured to engage an inner edge of the annular rim that extends inwardly from the upper edge of the sidewall of the paint container;
    an intermediate segment configured to extend between the first segment and the second segment; and
    an angular member formed by a convergence of the intermediate segment and the first segment, wherein the angular member is configured to fit into the recess.

2. The support clip of claim 1, further comprising a paint brush holder mounted to the brush holder support section, wherein the paint brush holder is configured for holding a handle of a paint brush with bristles of the paint brush suspended substantially vertically below the paint brush holder.

3. The support clip of claim 2, wherein the paint brush holder is mounted to the brush holder support section via pin and socket joint.

4. The support clip of claim 3, wherein the paint brush holder includes a pin and the brush holder support section includes a socket.

5. The support clip of claim 1, wherein the intermediate segment is configured to engage a lower surface of the rim.

6. The support clip of claim 1, wherein the second segment comprises a hook configured to fit over an upper lip at the inner edge of the rim, and second segment further comprises a portion configured to engage an inner edge surface at the inner edge of the rim.

7. The support clip of claim 1, wherein the intermediate segment is configured to engage the recess in the lower surface of the rim.

8. The support clip of claim 1, wherein the angular member is convex and is configured to fit into the recess in the lower surface of the rim adjacent the inner sidewall surface.

9. The support clip of claim 1, wherein the first segment includes a protrusion configured to abut against the inner sidewall surface of the container in order to adjust orientation of the support clip.

10. The support clip of claim 1, wherein the support clip is frictionally retained by the inner sidewall surface of the container extending below the rim and the inner edge of the rim.

* * * * *